United States Patent

[11] 3,629,525

[72] Inventor Clifford C. Giese, Jr.
Kettering, Ohio

[21] Appl. No. 12,268
[22] Filed Feb. 18, 1970
[45] Patented Dec. 21, 1971
[73] Assignee Ledex Inc.

[54] LOAD SELECTOR ROTARY WAFER SWITCH WITH PRINTED CIRCUIT
10 Claims, 12 Drawing Figs.

[52] U.S. Cl. .......... 200/11 DA, 200/18, 335/138
[51] Int. Cl. .......... H01h19/58, H01h 51/08
[50] Field of Search .......... 200/11 A, 11 D, 11 TW, 18, 166 PC; 335/138; 317/101 CM, 101 D

[56] References Cited

UNITED STATES PATENTS

| | | | |
|---|---|---|---|
| 3,164,690 | 1/1965 | Heide | 200/11 D |
| 3,198,894 | 8/1965 | Krug | 200/11 A |
| 3,284,583 | 11/1966 | Buzzi | 200/11 R |
| 3,310,641 | 3/1967 | Eshleman | 200/11 D |
| 3,467,792 | 9/1969 | Allison | 200/11 D |
| 3,496,315 | 2/1970 | Giese, Jr. et al. | 200/18 |
| 3,405,376 | 10/1968 | Giese, Jr. et al. | 335/138 |

*Primary Examiner*—J. R. Scott
*Attorney*—Dybvig & Dybvig

ABSTRACT: Wiring for a plural position selector switch is reduced by use of printed circuit elements. Compactness of construction is achieved through the use of two wafers laminated face to face and conductive leads disposed at the interface between the wafers. Rivets, where desired, provide through connections from one wafer to the other.

PATENTED DEC 21 1971

3,629,525

SHEET 1 OF 2

INVENTOR.
CLIFFORD C. GIESE JR.

BY Dybvig and Dybvig

HIS ATTORNEYS

INVENTOR.
CLIFFORD C. GIESE JR.

BY Dybvig & Dybvig

HIS ATTORNEYS

LOAD SELECTOR ROTARY WAFER SWITCH WITH PRINTED CIRCUIT

BACKGROUND OF THE INVENTION

1. Field of the Invention

This invention relates to a load selector switch for sequentially energizing loads while grounding or disabling all loads except a single load being energized. More particularly, the invention relates to a novel printed circuit arrangement which allows a substantial elimination of wiring in a compact selector switch package.

2. Description of the Prior Art

The present invention is an improvement upon the structures described in U.S. Pat. Nos. 3,405,376 and 3,496,315. The foregoing patents relate to load selector devices which are designed for two modes of operation. In one mode an operator energizes the load selector to successively select loads at time intervals controlled by the operator. In the other mode the operator, by a single energization of the selector switch mechanism, permits the selector switch to self-step through all loads at time intervals controlled by the selector switch mechanism and outside the control of the operator. This latter characteristic gives rise to a generalized name "intervalometer" which has been applied to such devices.

While the intervalometers of the foregoing patents can be used with numerous types of loads, a prominent application for the intervalometers is in the firing of munitions. Thus, in the firing of rockets from a launcher installed on an aircraft, it is important that the sequence of rockets fired be carefully controlled so that successively fired rockets do not collide in midair and a desired scatter pattern of the successively fired rockets is achieved.

SUMMARY OF THE INVENTION

Intervalometers for sequentially firing rockets or missiles from an airplane are desirably small in size and light in weight. It is also a desirable property of such intervalometers that they ground or disable all load elements except the one which is to be fired. It is also an obvious requirement that the intervalometer be totally disabled while installing rocket weaponry on the aircraft. The wiring which is required to provide all of these features, if indeed wiring is used, becomes quite extensive and becomes a limiting factor to the smallness and compactness of the intervalometer design. The extensiveness of wiring also becomes a substantial cost factor, especially in the labor required to complete the wiring.

To minimize labor costs for wiring and reduce the space consumed by wiring, the present invention replaces wiring with printed circuit wafers. However, available printed circuit techniques were found to impose design limitations which had to be overcome by means of the present invention. In particular, it was necessary to bring 12 printed conductors to a 12 position selector switch, all from one edge or end of a printed circuit assembly. Since printed circuit conductors must be spaced apart on a supporting wafer, the requirement for 12 conductors entering one end or edge of a printed circuit wafer appeared to set a size limit which would be incompatible with the overall design objective of compactness. This apparent size limit has been avoided in the present invention by laminating two printed circuit wafers face to face so that, while not consuming any substantial space, printed circuit conductors could be located at the interface between two wafers. In practical effect, this procedure doubled the available area for printed circuit conductors in a fashion that did not substantially increase the space required in the selector switch package for the printed circuit wafers. The use of the above described face-to-face wafer lamination together with a novel arrangement of connector pins which interface the selector switch with a rocket launching structure resulted in a highly economically assembled load selector switch structure.

An object of the present invention is to provide a new and improved load selector switch.

Another object of the present invention is to provide a compact printed circuit wafer assembly.

Still another object of the present invention is to provide a printed circuit wafer assembly compatible to selector switch requirements.

Yet another object of the present invention is to provide an improved connector assembly for interfacing printed circuit components of a selector switch assembly with external load devices operated by the selector switch assembly.

DESCRIPTION OF THE PREFERRED EMBODIMENT

Figures 1, 5, 6, 7, 8, 9, 10:
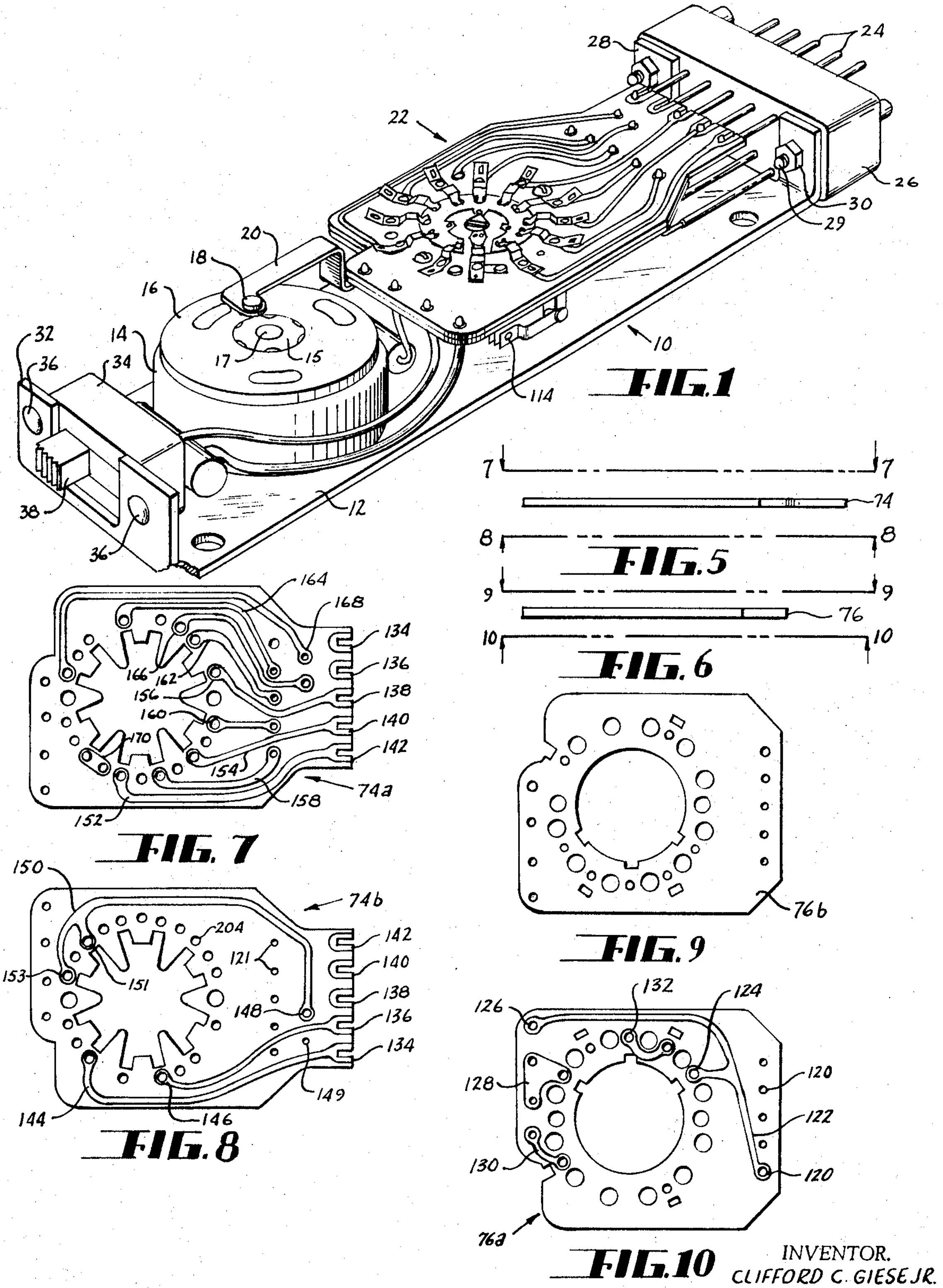
FIG. 1 is a perspective view illustrating the load selector switch of the present invention with its cover removed.
FIG. 5 is a side elevation view of a voltage output wafer for the selector switch assembly.
FIG. 6 is a side elevation view of a voltage input wafer for the selector switch assembly.
FIG. 7 is a plan view taken in the direction of the arrows 7—7 of FIG. 5.
FIG. 8 is a plan view taken in the direction of the arrows 8—8 in FIG. 5.
FIG. 9 is a plan view taken in the direction of the arrows 9—9 of FIG. 6.
FIG. 10 is a plan view taken in the direction of the arrows 10—10 of FIG. 6.

Referring to the drawings, and more particularly FIG. 1, the intervalometer 10 is assembled upon a base member 12. Motive power for operating the intervalometer is derived from an electromagnetically powered limited stroke rotary actuator which is of the type more fully described in U.S. Pat. No. 2,496,880 issued to George H. Leland Feb. 7, 1950. The rotary actuator comprises an electromagnet 14 which, when energized, attracts an armature 15 affixed to a shaft 17. The armature 15 carries a plate 16 which, by means of inclined surfaces formed thereon and cooperating inclined surfaces formed on a confronting face of the housing for the electromagnet, acts upon ball elements interposed between the inclined surfaces to cause rotation of the plate 16 as the armature is attracted toward the electromagnet. The rotary stroke of the plate 16 thus produced is limited by the aforesaid inclined surfaces, which trap the ball elements rolling thereon after a fixed amount of rotary travel.

The actuator illustrated must be reset at the end of each rotary output stroke. Thus, after the armature 15 has been attracted to the electromagnet to produce the rotary stroke, it is necessary to return the armature and the plate 16 carried thereby to their initial positions so as to prepare the actuator for a second output stroke. In the present invention this is accomplished by causing the plate 16 to rotate against a spring bias which induces a counter rotation of the plate 16 as soon as the electromagnet is deenergized. This counter rotation resets the actuator so that a new rotary stroke can be executed when the electromagnet is again energized.

Affixed to the plate 16 is a pivot pin 18 which engages a link 20. Due to the pivotal connection between the link 20 and the plate 16, the link 20 reciprocates along its length as the plate 16 is oscillated rotationally by operation of the electromagnet 14. By mechanisms later to be described, the reciprocal movements of the link 20 are used to advance a selector switch 22 in a stepwise unidirectional movement through a plurality of switch positions.

The selector switch 22 is interfaced to remote devices which are to be sequentially operated by means of connector pins 24 molded into an insulating plastic body 26.

Flanges 28 struck upwardly from the base 12 support the body 26 which has threaded studs 29 fastened therein. The threaded studs 29 pass through suitable apertures in the flanges 28 to threadedly engage nuts 30 which secure the body 26 to the flanges 28.

Similar flanges 32 struck up from the opposite end of the base 12 support a mode selector switch 34 secured to the flanges 32 by means of rivets 36. The selector switch 34 has a two position operator 38 which projects into a gap between the flanges 32.

Figures 2, 3, 4, 11, 12:
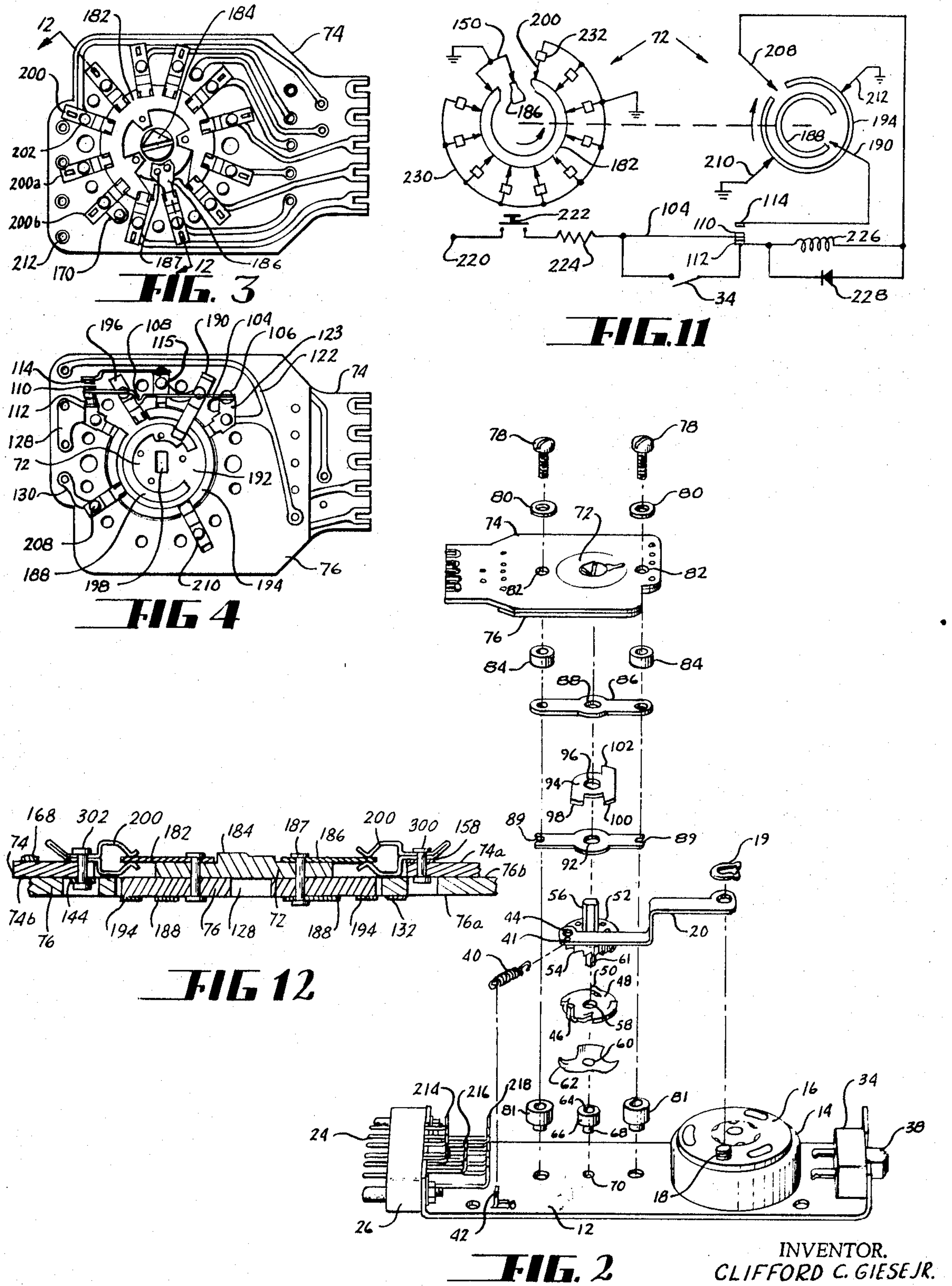
FIG. 2 is an exploded perspective view of the preferred embodiment.
FIG. 3 is a plan view illustrating one face of a selector switch assembly employed in the preferred embodiment.
FIG. 4 is a plan view of the opposite face of the selector switch assembly.
FIG. 11 is a schematic diagram of the electrical circuit of the preferred embodiment.
FIG. 12 is a fragmentary section view taken approximately along the line 12—12 of FIG. 3, slight deviations having been made to expose rivets lying adjacent the indicated section line.

The mechanisms by which the reciprocal movements of the link 20 are used to advance the selector switch 22 are illustrated in FIG. 2, In this figure, it can be seen that the link 20 is pivotally secured to the pivot pin 18 by means of an arcuate snapring 19. The link 20 is normally biased to the left, as appears in FIG. 2, by a spring 40 engaged in a hole 41 in the link 20 and engaged at its opposite end to a post 42 struck upwardly from the base 12. When the electromagnet 14 is energized, rotation of the plate 16 draws the link 20 to the right, as viewed in FIG. 2. When the electromagnet is deenergized, tension in the spring 40 returns the link 20 to the left, as viewed in FIG. 2, and during this return the actuator mechanism resets in a well-known manner.

The link 20 has an aperture 44 therein which receives a post 46 struck upwardly from a driver ratchet 48. The driver ratchet 48 has upwardly struck teeth 50 adapted to interfit downwardly extending teeth 54 in a driven ratchet 52. Fixedly attached to the driven ratchet 52 is an upright double-D shaft which drives a selector rotor 72 of the selector switch mechanism.

The two ratchets 48 and 52 are mounted for rotation about a common axis by means of a downwardly extending pilot 61 which is an extension of the shaft 56 and which enters an aperture 58 in the driver ratchet 48. This downwardly extending pilot also enters an aperture 60 in a biasing spring 62 and after entering the aperture 60 also enters and pilots in an aperture 64 in a bushing 66. The bushing 66 has a downwardly extending pilot 68 press fitted into an aperture 70 in the base 12. The apertures 58 and 60 in the ratchet 48 and spring 62 are larger in diameter than the bushing 66. Accordingly, these elements encircle the bushing 66 when the assembly is complete. The action of the spring 62 is to urge the driver ratchet 48 upwardly against the confronting face of the driven ratchet 52.

The aforementioned shaft 56 interfits a mating aperture or key 198 in selector rotor 72. The selector rotor 72 is journaled for rotation in an aperture formed by confronting stator wafers 74 and 76. The wafers 74 and 76 are secured against rotation relative to the base 12 by means of threaded screws 78 which enter washers 80 and penetrate apertures 82 in the assembled wafers 74 and 76. The screws 78 threadedly engage nuts 81 having downwardly extending pilots press fitted into the base 12.

Before the screws 78 are threaded to the nuts 81, they are passed through spacers 84 through suitable apertures located in a rigid spacer strap 86 and through notches 89 located at the ends of a spring member 90. The aforementioned strap 86 has a aperture 88 receiving the shaft 56. The spring 90 also has an aperture 92 receiving the shaft 56.

In constructing the assembly illustrated in FIG. 2, an interrupter switch cam 94 is positioned on the shaft 56 between the strap 86 and the spring 90. For this purpose the cam 94 has an aperture 96.

The cam 94 has arms 98 and 100 which are spaced to receive the upwardly struck post 46 which is a part of the driver ratchet 48. Because the driver ratchet 48 is directly oscillated by the link 20 which also engages the post 46, the interrupter cam 94 is also oscillated by reason of the post 46 bumping against the arms 98 and 100. It will be noted however that the post 46 is small in relation to the space between the arms 98 and 100 and accordingly engages these arms only toward the ends of its travel. Thus, there is lost motion between the oscillatory movements of the post 46 and the oscillatory movements of the cam 94. The cam 94 also has an arm 102 which operates an interrupter switch blade in a manner later to be described.

The general operation of the switch operator mechanism of FIG. 2 is as follows. Upon energization of the actuator the link 20 is pulled to the right, as appears in FIG. 2. This movement of the link 20 causes the driver ratchet 48 to execute a predetermined counterclockwise rotary stroke. The teeth 50 on the ratchet 48 accordingly drive the driven ratchet 52 through a predetermined counterclockwise stroke. By reason of the connection between the shaft 56 and the switch rotor 72, the switch rotor 72 is also given a predetermined counterclockwise stroke. As previously described, the post 46 on the driver ratchet 48 will strike the arm 100 on the interrupter cam 94 as it approaches the end of its travel. An interrupter switch later to be described in detail is then opened because of the movement imparted to the arm 102 of the cam 94. This interrupter switch interrupts the supply of power to the electromagnet 14 thus allowing the spring 40 to return the link 20 to the left, as appears in FIG. 2. As the link 20 is drawn to the left, the teeth 50 on the driver ratchet 48 slip past the teeth 54 in the driven ratchet 52. Thus, the return motion of the link 20 and the driver ratchet 48 is not transferred to the driven ratchet 52 or to the switch rotor 72. To allow the described slippage between the teeth 50 and the teeth 54, the spring 62 yields. To assure that the described slippage occurs, the spring 90 may be equipped with downwardly facing detent protrusions, not appearing in the drawing, which grip the driven ratchet 52 such that the driven ratchet 52 holds its position as the driver ratchet 48 is returned by action of the spring 40.

As the return motion of the link 20 proceeds, the post 46 strikes the arm 98 of the cam 94 permitting the arm 1 02 to release its action of the interrupter switch, yet to be described. This allows power to return to the electromagnet 14.

The above-described operation results in a self-stepping behavior in which the shaft 56 is driven incrementally in the counterclockwise direction at a speed determined by the inherent capabilities of the spring 40 and the electromagnet 14. This self-stepping action is used to advance the switch rotor 72 in the counterclockwise direction so as to achieve various switching functions to be described in the following paragraphs.

The general circuit operation which is to be accomplished with the selector switch operator illustrated in FIG. 2 is diagrammatically illustrated in FIG. 11. The switch rotor 72 has two operating faces, an input face illustrated in the upper right of FIG. 11, and an output face illustrated in the upper left of FIG. 11. On the input face are concentric conductive arcs 188 and 194. The arc 188 is adapted to wipe under a feeder contact 190. The conductive arc 194 is adapted to wipe under spaced contacts 196, 208 and 210. As appears in FIG. 11, the contacts 196 and 210 are grounded contacts.

The opposite or output face of the rotor 72 comprises a conductive arc 182 whose ends straddle a voltage supply tab 186. A plurality of 12 equally spaced stator contacts surround the rotor 72 and wipe its output face. A single reference number 200 identifies one of these contacts and throughout this specification the reference number 200 will be used arbitrarily to identify any of these contacts. Since there are 12 equally spaced contacts 200, the angle between adjacent contacts is 30°. The actuator mechanism described in reference to FIG. 2 is designed to rotate the shaft 56 in 30° steps.

The actuator mechanism of FIG. 2 has the capability of stepping the voltage supply tab 186 progressively to each of the stator contacts representatively numbered 200. The arc 182 is of course moved in unison with the voltage supply tab 186 and it can be noted that the gaps between the tab 186 and the arc 182 are less than 30°. Thus, whenever the tab 186 engages any one of the stator contacts 200, the arc 182 engages the other 11 contacts 200.

It will noted that two adjacent stator contacts in the group representatively numbered 200 are grounded by means of a conductor 150. Since these adjacent contacts are grounded, it is not possible for the rotor 72 to be stepped to a position where the arc 182 is not at ground potential. Thus, all the stator contacts which wipe the output side of the rotor 72 except the one being engaged by the tab 186 will be at ground potential and in any event two of the contacts 200 are always at ground potential by reason of the previously described conductor 150.

The 10 stator contacts 200 which are not necessarily at ground potential are connected through load elements 232 to a grounded conductor 230. As previously indicated, the load elements may be rockets contained in an aircraft launcher. In such event the grounded conductor 230 will represent the launcher housing which will be grounded to the airframe.

The rocket-firing voltage which would be available in the aircraft is shown schematically at 220, this being a positive voltage. The rocket firing is under the control of a pilot who has a push button switch schematically shown at 222. It is conventional in rocket-firing circuits to employ a current-limiting resistor 224 which limits the current in the event of a short circuit in any portion of the circuitry.

Reference has been made previously to an interrupter switch operated by the arm 102 of the cam 94 illustrated in FIG. 2. This interrupter switch is schematically shown in FIG. 11 as a flexible blade 104 which is cantilever mounted so as to have a movable end 110. The movable end 110 is normally biased to touch a contact 112. The contact 112 is electrically connected to one end of the operating coil 226 for the electromagnet 14. The opposite end of the coil 226 is connected to the previously described stator contact 208. A diode 228 placed across the coil 226 permits discharge of the coil 226, when the latter has been deenergized. The previously described mode selector switch 34 is shown schematically across the interrupter switch comprising the elements 104 and 112.

When the interrupter switch is operated by the previously mentioned cam 94, the blade 104 is displaced from its position engaging the contact 112 to a position engaging a contact 114. The contact 114 is electrically common to the previously mentioned feeder contact 190.

FIG. 11 illustrates the intervalometer circuitry in a position known as the "safe" or "load" position. Thus, should the manual switch 222 be depressed, the coil 226 cannot be energized because that coil is not connected to ground. Likewise, all the rockets simulated at 232 are grounded at both ends thereof by reason of the ground on the conductive arc 182.

This intervalometer position enables crewmen to load rockets onto the rocket launcher without the concern that a voltage will be available to accidentally fire one or more of the rockets.

To place the intervalometer into a position where rocket firing can be accomplished, it is necessary that the rotor 72 be manually rotated 30° so as to advance the voltage supply tab 186 to the second stator contact 200 grounded by the conductor 150. This rotation will cause the conductive arc 194 to wipe under the contact 208, thus providing a ground connection for the coil 226. It will also advance the conductive arc 188 toward the feeder contact 190, but not so far that the arc 188 will touch or wipe the feeder contact 190. The circuit is then in what is known as the "armed" position and manual operation of the pushbutton switch 222 will cause automatic stepwise firing of all 10 rockets being controlled by the intervalometer. The following is the sequence of events that produces this result.

Upon depression of the switch 222, current flows from the voltage source 220 through the resistor 224, the interrupter switch blade 104, the contact 112 and the coil 226 to the ground which is now available at the stator contact 208. This energizes the electromagnet 14 which pulls the link 20 to the right as viewed in FIG. 2. By reason of the actuator structure previously described, this causes the shaft 56 to rotate 30° in the counterclockwise direction. It also causes the arm 102 on the cam 94 to engage the interrupter switch blade 104 causing its end 110 to touch the contact 114. As the switch blade 104 is moving to engage the contact 114, the shaft 56 is driving the rotor 72 so as to move the voltage supply tab 186 to firing engagement with a first rocket 232. By means to be described, the voltage supply tab 186 is electrically common to the conductive arc 188. As the voltage supply tab 186 engages a contact for firing the first rocket to be fired, the conductive arc 188 also wipes under the feeder contact 190 at the same time the interrupter switch blade 104 is touching the contact 114. The interrupter switch blade 104 is of course at positive voltage because the pushbutton switch 222 is being manually depressed. A brief instant has thus occurred when the voltage supply tab 186 is in position to fire a rocket and is receiving positive voltage from the interrupter switch blade 104 through the contact 114, the feeder contact 190 and the conductive arc 188. The first rocket is thus fired.

As the first rocket is being fired, the supply voltage to the coil 226 has been interrupted by reason of the interrupter switch blade 104 disengaging the contact 112. The magnetic field about the coil 226 therefore collapses, generating a current through the diode 228. The collapse of the magnetic field about the coil 226 allows the spring 40 to return the link 20 to the left, as viewed in FIG. 2. This movement results in a pivoting of the cam 94 in the clockwise direction so that the cam arm 102 releases the interrupter switch blade 104. This allows the blade 104 to return to touching engagement with the contact 112.

When the switch blade 104 reengages contact 112, the coil 226 is reenergized and the above sequence of events repeated so as to bring the voltage supply tab 186 under a second rocket-firing contact with the result that a second rocket is fired. In a typical intervalometer construction, the time interval between successive rocket firings can be 20 milliseconds. Thus, 10 rockets will be successively fired in a time interval of 200 milliseconds, i.e., one-fifth of a second. It is not logically possible for a pilot to release the manual switch 222 within the one-fifth of a second following closure of the switch 222, and accordingly, one closure of the switch 222 results in a ripple firing of all 10 rockets subject to the control of the described intervalometer.

It can be noted that after the tenth rocket is fired, the electromagnet 14 will advance the voltage supply tab 186 into the position illustrated in FIG. 11. When this position is reached, the coil 226 is isolated from ground and thus the entire intervalometer assembly advanced to the "armed" position as previously described.

The preceding description of the operation of the intervalometer to ripple fire rockets has proceeded without reference to the mode selector switch 34. As appears in FIG. 2, the mode selector switch is a manual switch positioned by a switch operator 38. The switch operator 38 either opens or closes the switch 34 as schematically illustrated in FIG. 11. The preceding description assumed the switch 34 to be open. If the switch 34 is closed, a different mode of operation results.

It is contemplated that the switch 34 will be located in the intervalometer which in turn is mounted in a rocket launcher. Thus, it is contemplated that the condition of the switch 34 will be established before the airplane carrying the rockets takes off and not susceptible to any in-flight change. It is also contemplated that the position of the switch rotor 72 will be manually placed at the "armed" position after rockets have been loaded and before the time of takeoff.

With the switch 34 closed and the rotor 72 rotated 30° from the position shown in FIG. 11 to manually place the intervalometer in its "armed" position, the in-flight operation will proceed as follows.

When the pilot desires to fire a rocket, the switch 222 is depressed. This energizes the coil 226 in the manner previously described. The electromagnet 14 therefore advances the shaft 56 30°, thus moving the voltage supply tab 186 to engagement with the first rocket-firing contact. As this action occurs the interrupter switch blade 104 is also being moved to touch the contact 114, thus applying a voltage to the tab 186 for firing the first rocket. However, in contrast to the previously described ripple fire operation, movement of the interrupter switch blade 104 away from the contact 112 will not remove voltage from the coil 226. This is because the switch 34 has shunted and effectively disabled the interrupter switch mechanism. Accordingly, the coil 226 will remain energized and the spring 40 will not be able to perform its reset function. In consequence the voltage supply tab 186 remains in position to fire only the first rocket until such time as the pilot releases his pushbutton switch 222. When the pushbutton switch 222 is released, voltage is removed from the coil 226 and the spring 40 can perform its reset function. However, this reset occurs without movement of the rotor 72 and therefore the voltage supply tab 186 remains in the first rocket-firing position and a second rocket cannot be fired until the pilot again depresses the pushbutton switch 222. Thus, the mode of operation that results when the switch 34 was closed prior to takeoff is a single fire mode of operation in which the pilot can successively fire single rockets at time intervals which are strictly within his own control. To fire all 10 rockets it takes 10 successive manual depressions of the switch 222.

The various switching functions above described are predetermined by the construction of the previously described wafers 74 and 76. For reasons to become apparent, it is convenient to refer to the wafer 74 as a voltage output wafer and the wafer 76 as a voltage input wafer.

Connections from the wafers 74 and 76 to the various loads to be energized and to the voltage from the source 220 are made through the connector pins shown in FIG. 2. The connector pins are arranged in three groups labeled 214, 216 and 218. The group labeled 214 comprises five connector pins. The group labeled 218 also comprises five connector pins. The group labeled 216 comprises two connector pins. In the case where the loads are rockets to be fired from an aircraft, the negative side of the voltage available on the airframe is always grounded to the airframe and thus a ground connection provided by one of the pins 216 is a ground to the airframe and also the negative side of the voltage supply.

Turning attention first to the input wafer 76, this wafer is shown in edge view in FIG. 6. A top plan view in FIG. 9 illustrates its face **76*b* and a bottom plan view in FIG. 10 illustrates its opposite face 76*a*. The wafer is an insulating body having nonconductive faces except where printed conductors to be described have been applied. The face 76*b*** has no conductors printed thereon.

Appearing along the right margin of this wafer, as viewed in FIGS. 9 and 10, is a row of five apertures representatively marked 120. Each aperture 120 is adapted to receive a connector pin 218. As appears in FIG. 10, one of these apertures 120 is surrounded by an imprinted conductor 122 which makes connection to apertures 124 and 126 passing through the wafer 76. Features also appearing on the face **76*a* which will be further discussed at a later point in this specification are a triangular conductor 128 linking three apertures through the wafer, an arcuate conductor 130 linking two apertures through the wafer, and an arcuate conductor 132** also linking two apertures through the wafer.

The output wafer 74 is shown in edge view in FIG. 5. One face **75*a* of this wafer appears in FIG. 7 and the opposite face 74*b* appears in FIG. 8. It can be noted that the wafer 74 is characterized by having five equally spaced notches 134, 136, 138, 140 and 142 along the right-hand margin thereof, as viewed in FIGS. 7 and 8. These notches are adapted to receive the five connector pins in the group numbered 214 in FIG. 2. On the face 74*a* of this wafer the connector pins in the notches 138, 140 and 142 make connection respectively with printed circuit conductors 156, 154, and 152. On the face 74*b* of this wafer, the connector pins received in the notches 134 and 136 make electrical connection to the respective printed circuit conductors 144 and 146**.

The wafer 74 is also characterized by apertures therein numbered 148 and 149. These apertures receive the two connecting pins in the group numbered 214 in FIG. 2. The connecting pin which enters the aperture 148 makes connection on the face **74*b* to a printed circuit conductor 150. Further explanation will show that this conductor 150 is the grounded conductor mentioned above in reference to FIG. 11. On the face 74*a* the connecting pin which is received in the aperture 148 also makes connection to a printed circuit conductor 162. The connecting pin which enters the aperture 149 makes electrical connection to a printed circuit conductor 168 appearing on the face 74*a* of the wafer 74**.

All position voltage supplied to the wafers 74 and 76 is supplied by the connecting pin which enters the aperture 120 in the wafer 76. This connecting pin connects to the aforementioned resistor 224 which is in the airframe. The connecting pin which enters the aperture 148 in the wafer 76 is connected to the airframe ground and hence the negative side of the power supply. All other connecting pins entering the wafers 74 and 76 are connected to loads such as rockets which are to be energized by operation of the intervalometer selector switch in the manners described. It will be noted that the five connector pins in the group 214 which enter the apertures 120 of the wafer 76 also enter aligned apertures 121 in the wafer 74. In all cases solder is used to assure connection between each connector pin and any printed circuit conductor which surrounds an aperture receiving such connector pin.

As previously mentioned, the sole voltage source for the wafers 74 and 76 is received at one of the apertures 120 in the wafer 76 and conveyed by the conductor 122 to apertures 124 and 126. Riveted into the aperture 124 so as to contact the conductor 122 is a conductive bracket1 23 which supports the above-described switch blade 104 by means of a rivet 106. The spring blade 104 is bent to form a cam follower 108 thereon and is provided with oppositely facing contact buttons on the free end 110 thereof. In its relaxed position, the spring blade 104 has its free end 110 biased against and touching the contact 112 appearing in FIG. 4. The contact 112 is supported by a bracket which electrically engages the previously mentioned conductor 128 on the wafer 76.

A permanent electrical connection exists from the bracket 123 to the blade 104 so that the positive voltage present on the printed circuit conductor 122 normally appears on the contact 112 and on the printed circuit conductor 128. The airframe ground is supplied by the connecting pin entering the aperture 148 in the wafer 74 and thus appears on the conductor 166 illustrated in FIG. 7. The ground on this conductor 166 is picked up by the rivet which secures the stator contact 210 to the face **76*a* of the wafer 76. It will be noted that this rivet picks up its ground connection from the wafer 74 and transfers the ground to the wafer 76. As will be later explained, the same is true of the rivet securing the aforementioned stator contact 196 which also picks up ground from the wafer 74 and transfers the ground to the wafer 76. Referring to FIG. 4, it can be seen that the stator contacts 210 and 196 are spaced at diametrically opposite positions with respect to the rotational axis for the rotor 72. It can also be noted that both of the contacts 196 and 210 are positioned for engagement with the conductive arc 194 disposed on the rotor 72 and extending throughout considerably more than 180° of arc about the rotor. Thus, it will always be true that one of the grounded contacts 210 and 196 engages the arc 194 and accordingly the arc 194** will remain at ground potential throughout all possible positions of the selector switch being described.

The conductive arc 194 is normally engaged by the stator contact 208 which is riveted to the wafer 76 and held by its rivet in permanent contact with the previously described arcuate conductor 130 on the face **76*a* of the wafer 76. It follows that the arcuate conductor 130 will remain at ground potential at all times except when a gap which prevents the conductive arc 194 from becoming a complete circle is aligned with the stator contact 208**.

By means of wiring which has been eliminated from the drawings so as not to obscure other details, the ends of the solenoid coil 226 are soldered in apertures connecting to the printed circuit conductors 128 and 130 in the wafer 76. Thus, with reference to FIG. 11, the printed conductor 128 is the FIG. 11 connection between the coil 226 and the contact 112 and the printed conductor 130 is the FIG. 11 connection between the coil 226 and the stator contact 208.

FIG. 3 illustrates the side 74*a* of the wafer 74. This side of the wafer supports the 12 equally spaced output contacts 200, each capable of wiping the tab 186. Each of the contacts 200 is secured by a rivet 202 which passes through a wafer aperture such as the aperture 204 illustrated in FIG. 8.

In this group of 12 contacts of which one has been illustratively labeled 200, two contacts have been specifically labeled 200*a* and 200*b*. The two contacts specifically labeled 200*a* and 200*b* are in continuous connection with the airframe ground by the following routes. The airframe ground reaches the wafer 74 by way of the connecting pin which enters the previously described aperture 148 in the wafer 74. The aperture 148 is connected by the conductor 150 to apertures 151 and 153 appearing in FIG. 8. The rivets which secure the stator contacts specifically labeled 200*a* and 200*b* pass through the wafer 74 and are flared so as to have electrical connection to the conductor 150 on the face 74*b* at the apertures 151 and 153 in the wafer 74. To assure good ground connection to the contacts 200*a* and 200*b*, these rivets may be soldered to the conductor 150 before the wafer 76 is secured in face contacting relation to the wafer 74.

While the contacts 200*a* and 200*b* appearing in FIG. 3 thus represent grounded contacts, the 10 other stator contacts representatively numbered 200 represent rocket firing contacts. Moving counterclockwise about the wafer 74 as it appears in FIG. 3 and counting from the first firing contact, which is immediately counterclockwise of the grounded contact 200*b*, the load energization or rocket firing paths are as follows. The first firing contact fires its load through the conductor 152 on the wafer 74. The second contact which is secured by a rivet designated 300 in FIG. 12 overlies a portion of the conductor 158 to electrically engage the same and energizes its load through the conductor 158 on the wafer 74. The third contact energizes its load through the conductor 154 on the wafer 74. The fourth contact energizes its load through the conductor 160 on the wafer 74. The fifth contact energizes its load through the conductor 156 on the wafer 74. The sixth contact energizes its load through the conductor 162 on the wafer 74. The foregoing energization paths all appear on the face 74*a* of the wafer 74.

The seventh contact has no conductor appearing on the face 74*a* of the wafer 74. Rather, the seventh contact is connected by its securing rivet to the conductor 146 appearing on the face 74*b* of the wafer 74.

The energizing path for the eighth contact proceeds through the conductor 164 on the face 74*a* of the wafer 74. The energizing path for the ninth contact resides in the conductor 144 appearing on the face 74*b* of the wafer 74, the conductor 144 being electrically engaged to said ninth contact by its securing rivet 302 illustrated in FIG. 12. The energizing path for the 10th contact resides in the conductor 168 appearing on the face 74*a* of the wafer 74.

Summarizing the foregoing energizing paths, eight comprise printed circuits appearing on the face 74*a* of the wafer 74, and two comprise printed circuits appearing on the face 74*b* of the wafer 74. It is believed apparent from an inspection of the face 74*a* of the wafer 74 that further room simply does not exist for more than eight load-energizing circuits which can exit to the right, as viewed in FIGS. 7 and 8. Thus, two of the load-energization circuits proceed along the face 74*b* of the wafer 74.

It was previously explained that one of the objectives of the present selector switch circuitry was to provide a ground for all load-energizing circuits except a single circuit which is being used to energize a load. To achieve this grounding feature, the face of the switch rotor 72 which appears in FIG. 3 is equipped with the aforementioned conductive arc 182 which is a complete circle except at the position occupied by the aforementioned voltage supply tab 186. As previously explained, it is not possible for the arc 182 to have a position at which it is not grounded by either of the contacts 200*a* and 200*b*. It is important to note that the arc 182 grounds all contacts appearing in FIG. 3 except whatever single contact may be engaged by the voltage supply tab 186.

To avoid the possibility that the voltage on the tab 186 can be shorted to ground on the arc 182, it is necessary that the several contacts 200 be designed to disengage the tab 186 before moving to engagement with the arc 182. Likewise, the arc 182 must be designed to lag the tab 186 so as not to engage the particular contact 200 being wiped by the tab 186 until after the tab 186 has disengaged that contact. To accomplish these features, it is required that the gap in the arc 182 be slightly larger than the central angle between adjacent contacts 200 and, accordingly, there will be a transitory condition as the gap in the arc 182 passes the adjacent grounded contacts 200*a* and 200*b* when the arc 182 is disengaged. This condition occurs only between the described "load" and "armed" positions.

It was previously described in reference to FIG. 11 that the stator contacts 196 and 210 cooperate to assure that the conductive arc 194 on the rotor 72 is always at ground potential. It was also previously described that ground is delivered to the assembled wafers 74 and 76 by the connector pin which enters the aperture 148 in the wafer 74. The printed conductor 166 on the face 74*a* of this wafer encircles the aperture 148 and is thus soldered to the grounding connector pin which enters this aperture. The conductor 166 also encircles the aperture in the wafer 74 which receives the rivet which secures the stator contact 210. This rivet is flared onto the printed conductor 166 and thus grounds the stator contact 210.

The stator contact 196 is grounded by a somewhat different route. It has already been explained how the stator contact 200*b* is grounded. Underlying the stator contact 200*b* is printed conductor 170 appearing on the face 74*a* of the wafer 74. This printed conductor envelopes an aperture in the wafer 74 which receives the rivet securing the stator contact 196. This rivet passes through both of the wafers 74 and 76 to carry ground from the printed conductor 170 on the wafer 74 to the stator contact 196 which bears against the wafer 76.

FIG. 11 shows the interrupter switch contact 114 as electrically connected to the feeder contact 190. With reference to FIG. 4, this connection proceeds as follows. The contact 114 is supported by a bracket 115 which is riveted against the arcuate conductor 132 located on the face 76*a* of the wafer 76 and best illustrated in FIG. 10. The feeder contact 190 is also riveted against the same arcuate conductor 132 with the result that whenever the interrupter blade 104 applies voltage to the contact 114 the same voltage appears on the feeder contact 190.

The feeder contact 190 applies such voltage to the conductive arc 188 except when a gap 192 in the arc 188 underlies the feeder contact 190. The conductive arc 188 which is on the input side of the rotor 72 is rendered electrically common to the voltage supply tab 186 by means of rivets designed 187 in FIG. 3 which pass through the body of the rotor 72 so as to electrically connect the arc 188 to the voltage supply tab 186. One of the rivets 187 also appears in FIG. 12.

The assembly of the printed circuit wafers 74 and 76 with the rotor 72 proceeds as follows. The rotor 72 is initially in four parts. The first part is that side of the rotor which will support the conductive arc 182. This first part is a cylindrical insulator dimensioned to be received in the central opening of the wafer 74. The second part is that side of the rotor which supports the conductive arcs 188 and 194. This second part is a cylindrical insulator dimensioned to fit within the central opening in the wafer 76. The conductive arcs 188 and 194 are printed on this second rotor part and then the first and second rotor parts riveted together. Thereafter the first rotor part is seated in the wafer 74 and a third part, the conductive arc 182, riveted thereto. The conductive arc 182 cooperates with the secondimentioned rotor part to secure the rotor rotatably within the central opening of the wafer 74. The fourth rotor part is the tab 186 which is riveted to the rotor using through rivets which connect to the conductive arc 188 on the opposite side of the rotor. After the rotor has been assembled to the wafer 74, the 12 stator contacts 200 are next riveted to the wafer 74.

In a separate operation the interrupter switch parts are riveted to the wafer 76. The wafer 76 is then moved into face contacting relations with the wafer 74. The stator contacts 190, 196, 208 and 210 are then riveted into position using rivets which pass through both of the wafers 74 and 76. The rivet securing the contact 196 is flared against the wafer 74 so as to electrically contact the conductor 170. The rivet securing the contact 210 is flared against the wafer 74 so as to make electrical contact with the printed conductor 166. Tubular rivets as shown at 210 in FIG. 3 are also passed through both of the wafers 74 and 76 to securely lock the wafer assembly. These tubular rivets are used as desired to mount auxiliary circuit elements such as the diode 228.

When the wafers 74 and 76 have been assembled as described they are mounted to the actuator mechanism illustrated in FIG. 2 by the simple act of setting the assembled wafers on the groups of connector pins 214, 216 and 218. The connector pins are relatively rigid and prealigned to enter their appropriate notches and apertures. As this is being done, the key 198 in the rotor 72 is splined to the shaft 56 for a positive driving engagement between the shaft 56 and the rotor 72. Each of the connector pins in the groups 214, 216 and 218 is then contacted with solder to assure positive connections to their respective printed circuit paths. This soldering also strengthens the mounting of the printed circuit wafers to the actuator structure.

After this assembly is complete, the rotor 72 can be manually rotated in the counterclockwise direction since such rotation is not opposed by the driver ratchet 48. Such rotation is readily accomplished by inserting a screwdriver in a slot adjacent the base of the embossed arrowhead 184 on the rotor 72 and turning to whatever rotor position is desired.

Not shown in the drawing is a cover which fits over the top of the assembly as it appears in FIG. 1. This cover has an opening therethrough which us aligned with the arrowhead 184 on the rotor and allows convenient counterclockwise rotation of the rotor 72 by a screwdriver inserted adjacent the embossed arrowhead 184. As has become conventional for intervalometers of this type, the cover may have suitable indicia which identify the load and arm positions of the rotor 72 by their relationship to the embossed arrowhead 184.

Having thus described my invention, I claim:

1. A load selector assembly comprising, in combination, insulating input and output wafers each having a first surface, a second surface and an aperture communicating between said surfaces, means securing said wafers in first surface contacting relation and with said apertures aligned, a switch rotor mounted for rotation in said aligned apertures, said rotor having an input face adjacent the second surface of said input wafer and an output face adjacent the second surface of said output wafer, a voltage feeder contact mounted on the second surface of said input wafer, said rotor having a conductive arc on the input face thereof positioned to be wiped by said feeder contact, a plurality of spaced apart output contacts mounted on the second surface of said output wafer, said rotor having a conductive tab mounted on the output face thereof and positioned to be wiped by said output contacts, means extending through said rotor to electrically connect said tab to said conductive arc, means to rotate said rotor to advance said tab to successively wipe said output contacts, a plurality of output conductors affixed to said output wafer, each said output conductor electrically connected to one of said output contacts, at least one of said output conductors being affixed to said second surface of said output wafer, at least one of said output conductors being affixed to said first surface of said output wafer, means to conduct a source voltage to said feeder contact, and connector means electrically connected to said output conductors to apply voltages appearing thereon to loads to be operated by said selector assembly.

2. The assembly of claim 1 in which said output conductors are printed conductors.

3. The assembly of claim 2 in which said first and second surfaces of each said wafer are disposed on opposite sides of each said wafer.

4. The assembly of claim 1 in which said switch rotor is mounted for rotation about an axis perpendicular to its output face, and including a second conductive arc mounted on said output face and partially encircling said axis, opposite ends of said second arc being spaced to opposite sides of said tab, said second arc adapted to simultaneously wipe all output contacts not being wiped by said conductive tab, said second arc being so spaced from said tab as not to be shorted to said tab by any of said output contacts.

5. The assembly of claim 4 including means to ground said second arc.

6. The assembly of claim 5 wherein said means to ground said second arc comprises a grounding conductor disposed on said first surface of said output wafer, a pair of ground contacts, rivet means securing said ground contacts against said second surface of said output wafer, said rivet means having electrical connection to said ground conductor, said ground contacts positioned to wipe said second arc, said ground contacts being so arranged that said second arc at most has transitory separation from said ground contacts.

7. The assembly of claim 1 wherein said means to conduct a source voltage comprises second connector means to connect a source of voltage to said input wafer, a voltage input conductor affixed to said input wafer and electrically engaged to said second connector means, and means electrically connecting said input conductor to said feeder contact, said assembly including a conductive switch blade, conductive bracket means affixed to said input wafer and electrically connected to said voltage input conductor, said bracket means conductively engaging one portion of said conductive switch blade, a second voltage conductor affixed to said input wafer and insulated from said voltage input conductor, second bracket means affixed to said input wafer and electrically connected to said second voltage conductor, a first contact supported by said second bracket means to engage a portion of said conductive switch blade, a ground conductor affixed to said output wafer, a ground contact, a third conductive arc disposed on the input face of said rotor to wipe said ground contact, means securing said ground contact to said input wafer, said securing means completing electrical connection between said ground contact and said ground conductor, said means to rotate said rotor including a solenoid coil, means connecting one end of said coil to said second voltage conductor, means connecting the other end of said coil to said third conductive arc, and cam means responsive to energization of said coil to move said switch blade away from said first contact to interrupt the energization of said coil.

8. The assembly of claim 7 wherein said third arc has a gap therein effective to isolate said coil from ground at a predetermined rotary position of said rotor, and the first-mentioned arc has a gap therein also effective to isolate said tab from said voltage feeder contact at said predetermined rotary position.

9. In a switch mechanism comprising a stator assembly having plural output contacts and an input feeder contact, said stator assembly having an aperture therethrough, a rotor rotatably mounted in said aperture, said rotor having a conductive arc to wipe said feeder contact and a conductive tab electrically connected to said conductive arc, said tab positioned to successively wipe said output contacts upon rotation of said rotor, the improvement wherein said stator assembly comprises two insulating wafers and means securing said wafers in face contacting relation, one of said wafers having a voltage input conductor affixed thereto, means electrically connecting said input conductor to said feeder contact, the other of said wafers having a plurality of output conductors affixed thereto, there being one output conductor corresponding to each output contact, and means electrically connecting each of said output conductors to its corresponding output contact, at least one of said output conductors disposed on a face of said other wafer which contacts said one wafer, at least one other of said output conductors disposed on a different face of said other wafer.

10. The mechanism of claim 9 wherein said output conductors are printed conductors.

* * * * *

UNITED STATES PATENT OFFICE
CERTIFICATE OF CORRECTION

Patent No. 3,629,525 Dated December 21, 1971

Inventor(s) Clifford C. Giese, Jr.

It is certified that error appears in the above-identified patent and that said Letters Patent are hereby corrected as shown below:

Column 1, line 70, insert "compact" after highly.

Column 3, line 60, "a" should read ---an---.

Column 6, line 47, "is disabled until such time as the rotor 72 is manually" should be inserted between "assembly" and "advanced".

Column 7, line 62, "75a" should read ---74a---.

Column 8, line 13, "position" should read ---positive---.

Column 10, line 58, "designed" should read ---designated---.

Column 11, line 2, "secondimentioned" should read ---second mentioned---.

Column 11, line 11, "relations" should read ---relation---.

Column 11, line 43, "us" should read ---is---.

Signed and sealed this 6th day of June 1972.

(SEAL)
Attest:

EDWARD M.FLETCHER,JR.
Attesting Officer

ROBERT GOTTSCHALK
Commissioner of Patents